Patented Nov. 3, 1942

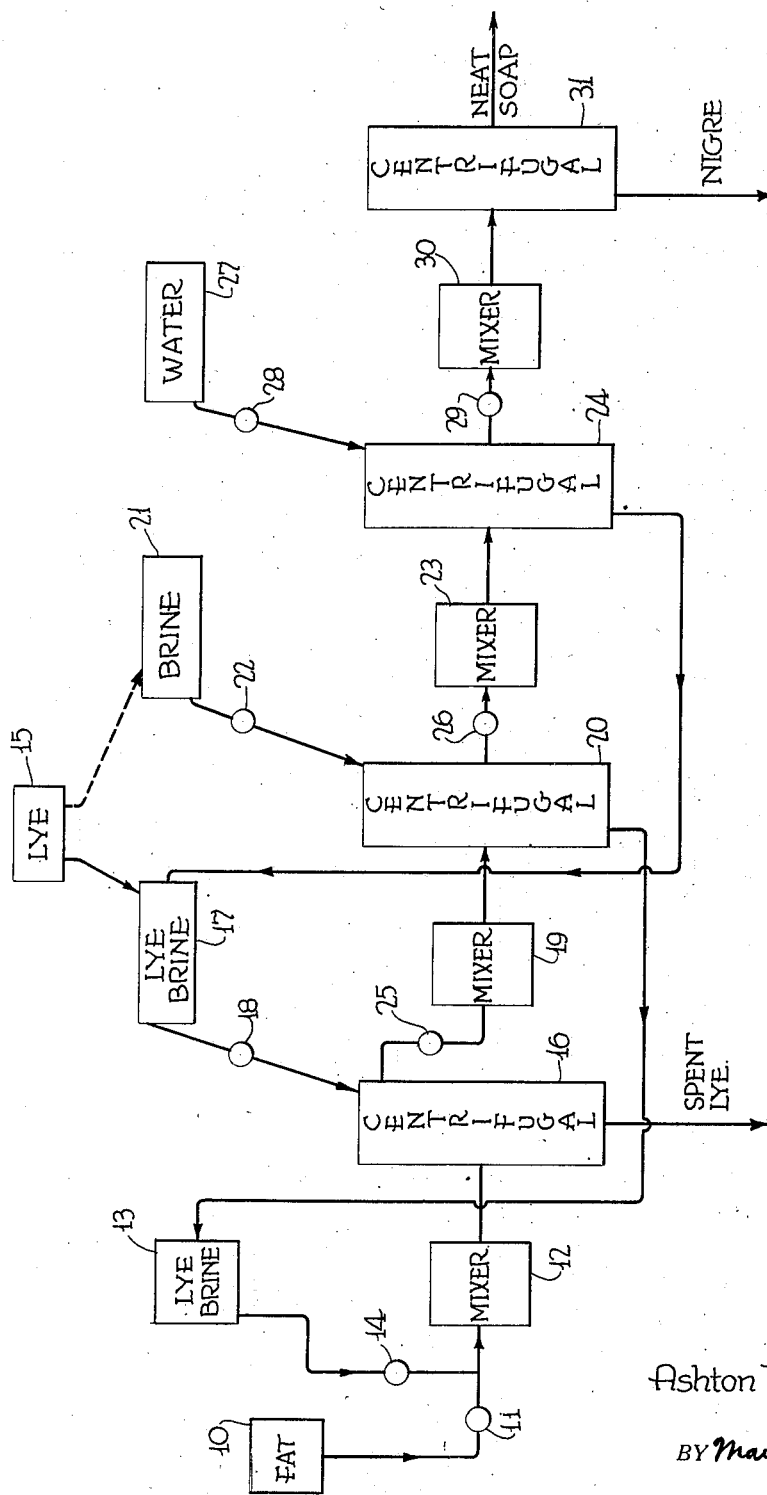

2,300,750

UNITED STATES PATENT OFFICE 2,300,750

MANUFACTURE OF SOAP

Ashton T. Scott, Ardmore, Pa., assignor to The Sharples Corporation, Philadelphia, Pa., a corporation of Delaware Application May 10, 1940, Serial No. 334,297

11 Claims. (Cl. 260—418)

The present invention relates to the art of soap making. In the conventional "full boiled" or "settled" process of soap making, the oils and fats which are to be converted into soap are boiled in open kettles with open steam. Saponification of the oils and fats is brought about by the addition of a caustic soda solution during the boiling process, and the saponification is completed by the practice of a succession of such boiling steps called "changes."

In accordance with the simplest prior art procedure, the oil or fat is initially boiled with a quantity of caustic soda solution which is somewhat less than the amount which would theoretically be required for complete saponification. This treatment is called the "killing change," since it results in the substantially complete utilization of the sodium hydroxide. When the boiling in the killing change is completed, the soap formed by reaction of the caustic soda with the fat is "grained out" or salted out by the addition of concentrated brine or dry salt. The action of the brine is to cause the soap to precipitate in the form of soap curds, and these curds rise to the top of the soap kettle. This permits the withdrawal from the bottom of the kettle of the "spent lye," which is the water solution of salt, glycerine, and any slight excess of alkali which may be present, together with some impurities and coloring matter. This spent lye is subjected to special treatment for glycerine recovery.

The soap curd remaining in the kettle at the end of the killing change is next brought into homogeneous solution by the addition of water, a procedure called "closing" the soap. The closed soap is next treated with strong caustic soda solution in a step known as the "strong change." The purpose of this operation is to complete the saponification of any neutral fat which may not have been saponified in the preceding killing change. After saponification is completed by boiling the mixture of caustic soda and fat and soap from the killing change in the strong change step, a further quantity of caustic soda solution is added in order to again precipitate the soap from solution and grain it, just as was done by the addition of brine in the killing change.

After sufficient caustic soda is added to complete the graining in the strong change, the passage of steam through the mixture is stopped, and the soap curd is allowed to rise to the top of the kettle. This permits withdrawal of the "half spent lye" from the bottom of the kettle. This half spent lye is a water solution containing some caustic soda, some glycerine washed from the soap, and some salt and impurities also washed from the soap.

After completion of one or more strong change steps, and in some cases after one or more "weak changes" in which the soap is washed with a brine solution, the soap-containing mass is passed to a "fitting" or "finishing" operation, in which it is treated with water and allowed to settle for a period of time which usually amounts to two or three days. An upper layer called "neat soap," which is a saturated solution of water in soap, and a lower layer called "nigre," which is a saturated solution of soap in water, are obtained as the result of this "fitting" step.

The half spent lye containing caustic soda, glycerine, salt and some impurities washed from the soap in the strong change is used in making up the caustic soda solution to be employed in the practice of the killing change. By using this partially spent lye as a saponifying agent in the killing change and by using in the killing change an amount of lye which is less than the amount required to completely saponify the oil or fat under treatment, the soap maker is enabled to obtain substantially complete utilization of all of the lye employed in the soap making operation. By utilizing more than enough lye to completely saponify the soap in the strong change step, on the other hand, the soap maker is enabled to complete the saponification of the oil or fat, and the fact that an excess of lye is used in this second step of the process is not a detriment to the economics of the process, since lye which is not used up in this second step, or strong change, is used up in connection with the passage of the spent lye to the saponifying step of the killing change.

In the practice of the process described above, the salt employed in the first or killing change plays a very important function. In the first place, this salt causes precipitation of the soap curds from the solution and makes possible separation of these soap curds from the glycerine, water, and lye in which the soap is dissolved until the salt is added. The water of the mixture, containing the added salt in solution, acts to wash the soap curds, removing glycerine from these curds and also removing other impurities which are not desired in the final soap product. In conventional soap making, the saponifying reaction of the first, or killing, change is carried to substantial completion (i. e., substantially all of the lye is used up) before the salt or salt solution is added. The reason for this procedure lies in the very fact that the salt solution tends to precipitate the soap from solution in the water, glycerine and other constituents of the mixture. In the saponification reaction of the killing change, as in any chemical reaction, a maximum degree of contact of the constituents to be reacted is desirable, in order to cause the reaction to proceed rapidly toward an equilibrium condition. The functions of the lye and the salt used in the killing change were in a sense opposite. The lye reacted with the oil or fat to produce soap, whereas the brine served to precipitate the soap from solution. It was a known fact that the brine, if present during the major part of the reaction of the fat with the lye, would tend to slow down the reaction by precipitating the soap from solution and destroying the intimate degree of contact desirable in the killing change. For these reasons, conventional practice involved avoidance of the presence of brine in the soap maker's mixture until the lye had been almost completely used up in the saponification reaction, and addition of brine only when it was desired to separate the already formed soap from the undesired glycerine, water and other constituents.

In my co-pending application, Serial No. 333,547, filed May 6, 1940, a process has been described and claimed in which the fat is continuously mixed with a carefully proportioned alkaline solution in a closed mixing apparatus, and the partially saponified mass is passed to a centrifugal separator to effect separation of soap from undesired constituents. This process has important advantages over the prior art kettle process discussed above, in that the soap product is improved, the amount of equipment employed and time consumed in the soap making process are greatly reduced, and other important economies are effected. In the practice of the process of this prior application, however, as in the practice of the conventional full boiled kettle process discussed above, a salt solution is added to the soap-containing mass produced in the first or killing change of the soap-making process, this salt being added after the saponification reaction has practically stopped, just as in the case of the full boiled kettle process.

The present invention is an improvement over the process of my prior application No. 333,547, as well as over the full boiled kettle process. An object of the present invention has been to obtain more efficient recovery of glycerine and more efficient removal of impurities from the soap than can be accomplished in connection with the process of my prior application No. 333,547.

An additional object has been to simplify and still further reduce the amount of equipment used in the practice of the process of my prior application No. 333,547.

A further object has been to effect a more accurate control of the temperature than was possible in the practice of the process of my prior application No. 333,547.

A still further object has been to provide a process by which soap is more efficiently washed from the cover of the centrifugal separator, and in which a proportioning of reagent to fat is accomplished in the same step by which this removal of soap from the cover is achieved.

The general procedure by which the above objects are accomplished consists in providing a continuous process as in prior application No. 333,547, but modifying the procedure of that application by adding the salt used to grain the soap from solution at the same time that the saponifying alkali is added to the fat. Thus, in the practice of the present invention, instead of having separate saponification and graining steps, these two operations occur substantially simultaneously, the soap being precipitated from solution just about as rapidly as it is formed. The present invention thus involves performance of a rapid and continuous process, treatment of relatively small volumes of fat and soap, and the practice of the desired soap making reaction in the presence of brine. Although the presence of the brine causes the reaction rate of saponification to be slowed down quite materially, the desired contact between fat and alkali may be maintained to complete the saponification reaction, by vigorously agitating the fat and lye, even in the presence of brine. Although I do not wish to be limited by any specific theory as to the reasons for the accomplishment of this result, it may be at least partially attributable to the fact that, once the continuous reaction is started and continuous flow of materials through the mixing chamber is established, the presence of soap formed in the mixer by reason of the reaction tends to cause the required emulsification of oil with alkali to produce more soap.

A further feature of the invention consists in the introduction of a mixture of lye and brine into the soap-receiving cover of the primary centrifugal separator by which spent lye from the killing change is separated from the soap.

Further objects and advantages of the invention, and the manner in which the above and these further objects are attained, will be evident from a reading of the following detailed description in the light of the attached flow sheet, in which the single figure is a diagrammatic representation of an arrangement of apparatus and flow of materials used in the practice of the process.

The invention will first be described in connection with the manufacture of a typical hard soap from a source of fat consisting of approximately 75% tallow and 25% cocoanut oil. It is to be understood, of course, that this form of description is adopted solely for the purpose of convenience, and that the invention is not to be limited because of specific description of the specific conditions applicable to the manufacture of soap from such a mixture.

The mixture of tallow and cocoanut oil is heated to a temperature sufficiently high to render it fluid and is passed continuously from container 10 by pump 11 through an enclosed mixer 12 to a centrifugal 16, under substantial superatmospheric pressure. The mixer 12 is provided with means for heating the material passed thereto, such, for example, as a steam jacket.

Simultaneously with passage of the fat to the mixer 12, a solution of dye and salt in water is passed to this mixer from container 13 by pump 14. This solution may contain, for example, approximately 9.1% of lye and 9.8% of brine. Such a solution may be passed to the mixer 12 in the ratio of 150 parts of the solution for each 100 parts of the specified fat mixture. These figures may, however, be varied within fairly wide limits, provided the solution passed to the mixer 12 is of such character that it fulfills the functions of saponifying most of the fat passed through this mixer, and precipitating the soap from solution as promptly as it is formed. In order to fulfill these two functions, the solution should contain an amount of lye which is only slightly less than the stoichiometric equivalent of the fat passed to the mixer, and it should contain an amount of salt which is comparable to the amount of salt ordinarily present in solutions resulting from the salting out of soap in conventional full boiled kettle soap making. The pumps 11 and 14 are preferably similar to the metering and pumping units, respectively, of the proportioning equipment illustrated and claimed in the United States patent to Jones, 2,009,890. By employing this type of proportioning apparatus it is possible to effect adjustment of the ratio of the relative rates of flow of lye and fat by a simple adjustment corresponding to adjustment of the screw 70 or 91 illustrated in Figures 4 and 7, respectively, of the patent drawing of that patent.

It will usually be unnecessary to apply heat to the jacket of the mixer 12 except at the very start of operations. While the process can be operated within a fairly wide temperature range, best results have been obtained in cases in which the temperature of the material leaving the mixer 12 was between 200 and 214° F. Lower temperatures may be used at the expense of speed of reaction, and higher temperatures may be used, provided the mixing and centrifugal equipment employed are designed to withstand substantial super-atmospheric pressure corresponding to the vapor pressure resulting from such higher temperatures.

The invention may be practiced by relative adjustment of the rate of flow of materials to maintain an average contact time between each particle of fat and lye of between 5 and 30 minutes, or contact times within an even wider range. Excellent results have been obtained in cases in which the rates of flow were adjusted to provide a contact time of approximately 15 minutes.

The mixture of soap curds with glycerine, water, salt, lye and impurities removed from the soap is next passed to a centrifugal separator 16 which is a continuously rotating machine designed to effect stratification of the soap curds as the lighter phase and the spent lye as the heavier phase, and to discharge these two phases continuously in liquid balance against each other into separate receiving covers. The spent lye may be discharged from the centrifugal cover which receives it and subjected to special treatment for glycerine recovery, as will be well understood by those skilled in this art. The soap curds, on the other hand, are subjected to further saponification treatment to insure that any oil not saponified in the mixer 12 is saponified in the second stage of the process. With the typical fat and reagent discussed above, the spent lye effluent from centrifugal 16 may contain 111 parts by weight of an aqueous solution of 0.2% NaOH, 12% NaCl, and 10% glycerine for every 100 parts of fat fed to mixer 12.

The centrifugal separator 16 may be a machine of the general type illustrated in the patent to Jones, 1,634,243, and the preferred practice of the invention involves the provision of a special conduit adapted to discharge liquid into the soap-receiving cover of the centrifugal. The arrangement of this conduit may also be similar to the elements 14 and 15 of Jones Patent 1,634,243. In the practice of the invention an aqueous solution of lye and brine is fed by pump 18 into the soap-receiving cover of centrifugal 16, and helps to wash this soap from the cover. The pump 18 by which the solution of lye and brine is passed to the centrifugal 16 may be inter-connected with the pumps 11 and 14 in such a way as to effect accurate proportioning of the ratio of lye and brine solution fed by pump 18 to the amount of fat and lye fed by pumps 11 and 14. By operating in this manner, and by proper control of the concentration and amount of the lye and brine solution fed by pump 18 to the centrifugal cover, the proportioning of lye and brine for the practice of the second saponification step of the process is accomplished in the same operation by which soap is removed from the soap-receiving cover of centrifugal 16.

Excellent results in the second saponifying step of the process have been obtained in cases in which the reagent passed from container 17 to the soap cover of centrifugal 16 consisted of 147 parts of an aqueous solution containing 10.6% lye and 10% brine for every 100 parts of fat fed to the mixer 12. The mixture of soap curds, unsaponified fat, and lye and brine solution is passed by pump 25 from the centrifugal 16 through a mixer 19, which may be a mixer of the same type as the mixer 12. It will ordinarily be desirable to supply heat to the jacket of mixer 19 continuously during the course of reaction, since the proportion of unsaponified fat present in the mixture passed through the mixer 19 is relatively small, and the reaction of this fat with lye will not generate sufficient heat to obtain optimum reaction conditions without application of external heat. In the mixer 19, the saponification reaction is completed, and soap is precipitated from solution as fast as it is formed, just as in the mixer 12, where the principal saponification reaction takes place.

The mixture of soap, salt, partially spent lye, glycerine, etc., passing from the mixer 19 is passed to a centrifugal separator 20 of the same general type as the centrifugal 16, and soap is continuously discharged from this centrifugal as the lighter phase, whereas the partly spent lye, containing glycerine, salt, etc., is discharged as the heavier phase. Under the typical conditions discussed above, this heavier phase may consist of 147 parts of an aqueous solution containing 9.1% NaOH, 9.8% NaCl and 3% glycerine for every 100 parts of fat fed to mixer 12. This heavier phase is returned to container 13, from which it is passed into confluence with further fat continuously fed through the steps of the process.

Brine from container 21 may be passed by pump 22 into the soap-receiving cover of the centrifugal 20 in order to assist in flushing soap from that cover, and the mixture of brine and soap so produced may be passed by a pump 26 through a mixer 23 to a centrifugal 24, which effects separation of the soap-containing mixture into soap and a brine solution of impurities, respectively. A small amount of lye from container 15 may also be passed to container 21 from time to time to assist in saponification of residual traces of fat.

The brine solution discharged from centrifugal 24 may be returned to the container 17, as illustrated, and used together with fresh lye from container 15 for washing soap from the soap-receiving cover of centrifugal 16, and for saponifying residual fat in that soap, as discussed above in connection with the operation of the mixer 19.

The soap discharged into the soap-receiving cover of centrifugal 24 may be washed from that cover by an accurately proportioned stream of water pumped to this cover from container 27 by pump 28. The mixture of soap and water thus discharged from the soap-receiving cover of centrifugal 24 may be passed by a pump 29 to a mixer 30, which may be similar to mixers 12, 19 and 23, and this mixture may then be passed to a centrifugal 31, which is similar to centrifugals 16, 20 and 24. Nigre and neat soap are discharged as separate effluents from centrifugal 31.

The manner in which the objects of the invention have been attained will be evident from the above discussion of the general features of the process. In the first place, in any soap making process, the water and brine present in the soap kettle during the course of the graining process cause the concentrated soap gel resulting from the saponification reaction to be broken down, with the result that fat, lye, glycerine, etc., which have been previously dissolved in that gel, form a separate phase from the soap curds resulting from the brine treatment. The water effects a washing action on the soap curds to cause separation of glycerine and impurities from these curds. In the conventional soap making process, this washing action can occur only during the graining or salting out stage of the operation, however, since the water is in solution in the soap gel until this salting out operation is commenced. In the practice of the present invention, on the other hand, the water and brine of the mixture effect a continuous washing of the soap curds during the entire course of the saponification reaction, since the soap is precipitated in the form of curds just as fast as it is formed, due to the presence of brine continuously in the reaction mixture.

The simultaneous use of lye and brine in the process also results in a material saving of equipment as compared to the process of my prior application No. 333,547, since the mixture of lye and brine requires the use of only one set of proportioning pumps, whereas an additional proportioning pump is necessary in the practice of the process of my prior application, in order to obtain accurate proportioning of the separately added brine.

The addition of the lye and brine simultaneously also results in a substantial advantage in that it promotes the fluidity of the material in the mixers. In the practice of the process of the present application, this material becomes more fluid as the reaction proceeds, whereas in the practice of my prior application it becomes more viscous as the reaction proceeds.

The efficiency of the washing of glycerine, spent lye and impurities from the soap in the second stage of the process is particularly improved by the simultaneous use of lye and brine, since a much larger proportion of aqueous phase can be employed with efficiency in this second stage of the process by simultaneous lye and brine addition than by a process affording a closer analogy to full boiled practice, involving addition only of strong lye in this second saponification stage.

The steps of introducing the lye, brine and water, employed in the second, third and fourth stages, directly into the covers of the respective centrifugals, is also highly advantageous. The introduction of the lye and brine into the cover of centrifugal 16 has the dual advantage of assisting in removal of soap from the centrifugal at the same time that the lye and brine are proportioned and introduced into the soap and oil-containing mass discharged from the centrifugal 16, for performance of the second saponification reaction. These features of introducing saponifying reagent and brine directly into the centrifugal covers are claimed in my co-pending application, Serial No. 439,446, filed April 18, 1942.

While we have discussed the invention above in terms of the use of sodium hydroxide as the saponifying agent, and of sodium chloride as the salting out agent, it will be understood that other saponifying reagents capable of forming an insoluble soap may be substituted for sodium hydroxide, and that other salts or salting out agents capable of precipitating the soap from solution may be substituted for sodium chloride. When the term salt is used in the attached claims, it is to be interpreted in this broader sense as a salting out agent.

Various modifications will be obvious to those skilled in the art. Centrifugals of other types than the type disclosed in Jones Patent 1,634,243 may, for example, be employed in separating soap from lye. Thus, the centrifugal of Jones Patent 2,089,123 may be employed for this purpose, and if this type of centrifugal is used, it will be unnecessary to introduce lye and brine or water into the centrifugal cover, since the soap will be discharged directly through a skimming nozzle in the use of this centrifugal.

Instead of employing only two counter-current saponification stages, as illustrated in the flow sheet and described above, three or more such stages may be employed, as is fairly common in conventional kettle soap manufacture. If three or more saponification stages are employed, the spent lye and brine from the centrifugal of the third stage will be used in making up the lye and brine solution to be fed to the centrifugal 16, and a mixture of lye and brine will be fed to the cover of centrifugal 20 for performance of the third saponification stage, instead of feeding only brine to this cover.

As a still further alternative, a lower aliphatic alcohol, such as ethyl alcohol, may be introduced into the mixer 12 along with the fat, and salt and alkali solution introduced into that mixer. The use of such an alcohol effects an improvement in the degree of contact between the fat and lye and thus speeds up the reaction rate.

In the above discussion, we have indicated that the lye and brine are to be introduced simultaneously as a single solution. While this type of operation represents the preferred embodiment of our invention, because it simplifies the pumping and proportioning problem, the lye and brine may be introduced as separate solutions within the broad principles of the invention. The principal feature of the invention consists in the operation of a continuous closed system under conditions where the brine is present in the saponification mass during saponification in sufficient quantity to "grain" the soap, and this result can be obtained just as well by introducing the brine as a separate solution as it can when the lye and brine are preliminarily mixed.

Still further modifications will be obvious to those skilled in the art, and I do not therefore wish to be limited except by the scope of the sub-joined claims.

I claim:

1. In the manufacture of soap, the process comprising mixing a source of fat with an aqueous saponifying reagent and with salt in sufficient amount to precipitate from the aqueous phase substantial quantities of soap formed by saponification, continuously passing these admixed materials through a saponifying chamber to saponify the fat in the presence of the salt and thus precipitate soap formed by the saponification reaction, and continuously separating the precipitated soap from the spent reagent phase resulting from the saponification reaction.

2. In the manufacture of soap, the process comprising mixing a source of fat with an aqueous saponifying reagent and with salt in sufficient amount to precipitate from the aqueous phase substantial quantities of soap formed by saponification, continuously passing these admixed materials through a saponifying chamber to saponify the fat in the presence of the salt and thus precipitate soap formed by the saponification reaction, and continuously separating the precipitated soap by centrifugation from the spent reagent phase resulting from the saponification reaction.

3. In the manufacture of soap, the process comprising continuously mixing a source of fat substantially simultaneously with an aqueous saponifying reagent and with salt in sufficient amount to precipitate from the aqueous phase substantial quantities of soap formed by saponification, continuously passing these admixed materials through a saponifying chamber to saponify the fat in the presence of the salt and thus precipitate soap formed by the saponification reaction, and continuously separating by centrifugation the precipitated soap from the spent reagent phase resulting from the saponification reaction.

4. In the manufacture of soap, the process comprising mixing a saponifying reagent and salt with a fluid fat, continuously passing these admixed materials through a saponifying chamber to saponify the fat in the presence of the salt and thus precipitate soap formed by the saponification reaction, continuously separating the precipitated soap by centrifugation from the reagent phase resulting from the saponification reaction and discharging the separated soap into a centrifugal cover, and passing further saponifying reagent into said centrifugal cover to assist in the discharge of soap from said cover.

5. In the manufacture of soap, the process comprising mixing a saponifying reagent and salt with a fluid fat, continuously passing these admixed materials through a saponifying chamber to saponify the fat in the presence of the salt and thus precipitate soap formed by the saponification reaction, continuously separating the precipitated soap by centrifugation from the reagent phase resulting from the saponification reaction and discharging the separated soap into a centrifugal cover, passing further saponifying reagent into said centrifugal cover to assist in the discharge of soap from said cover, and heating the mixture of saponifying reagent, soap and unsaponified fat so produced to effect completion of the saponification reaction with respect to said unsaponified fat.

6. In the manufacture of soap, the process comprising mixing a saponifying reagent and salt with a fluid fat, continuously passing these admixed materials through a saponifying chamber to saponify the fat in the presence of the salt and thus precipitate soap formed by the saponification reaction, continuously separating the precipitated soap by centrifugation from the reagent phase resulting from the saponification reaction and discharging the separated soap into a centrifugal cover, and passing an aqueous solution of saponifying reagent and salt into said centrifugal cover to assist in the discharge of soap from said cover.

7. In the manufacture of soap, the process comprising mixing a saponifying reagent and salt with a fluid fat, continuously passing these admixed materials through a saponifying chamber to saponify the fat in the presence of the salt and thus precipitate soap formed by the saponification reaction, continuously separating the precipitated soap by centrifugation from the spent reagent phase resulting from the saponification reaction, discharging the separated soap into a centrifugal cover, passing an aqueous solution of saponifying reagent and salt into said centrifugal cover to assist in the discharge of soap from said cover, continuously passing the mixture of aqueous solution, soap and unsaponified fat discharged from said centrifugal cover through a mixing chamber under saponifying conditions to effect saponification of residual fat and precipitation of soap formed by said last-mentioned saponification reaction and continuously separating the precipitated soap by centrifugation from the partially spent reagent phase resulting from said last-mentioned saponification reaction.

8. In the manufacture of soap, the process comprising mixing a saponifying reagent and salt with a fluid fat, continuously passing these admixed materials through a saponifying chamber to saponify the fat in the presence of the salt and thus precipitate soap formed by the saponification reaction, continuously separating the precipitated soap by centrifugation from the spent reagent phase resulting from the saponification reaction, discharging the separated soap into a centrifugal cover, passing an aqueous solution of saponifying reagent and salt into said centrifugal cover to assist in the discharge of soap from said cover, continuously passing the mixture of aqueous solution, soap and unsaponified fat discharged from said centrifugal cover through a mixing chamber under saponifying conditions to effect saponification of residual fat and precipitation of soap formed by said last-mentioned saponification reaction, continuously separating the precipitated soap by centrifugation from the partially spent reagent phase resulting from said last-mentioned saponification reaction, and passing said partially spent saponifying reagent separated in said last-mentioned step of centrifugation into confluence with a flowing stream of unsaponified fat to effect saponification of said fat in the continued practice of the process.

9. In the manufacture of soap, the process comprising mixing a partially saponified fat-containing mass with an aqueous saponfiying reagent and salt in sufficient quantity to effect substantial precipitation from the aqueous phase of soap formed by further saponification, passing these admixed materials through a saponifying chamber to saponify the fat in the presence of the salt and thus precipitate soap formed by the saponification reaction, and centrifuging the resulting mixture to separate soap from aqueous phase.

10. In the manufacture of soap, the process comprising mixing a partially saponified fat-containing mass with an aqueous saponifying reagent in more than sufficient quantity to complete the saponification of the fat of said fat-containing mass, and with salt in sufficient quantity to effect substantial precipitation from the aqueous phase of soap formed by further saponification, passing these admixed materials through a saponifying chamber to saponify the fat in the presence of the salt and thus precipitate soap formed by the saponification reaction, centrifuging the resulting mixture to separate soap from aqueous phase containing salt and excess saponifying reagent, and saponifying additional fat by treatment thereof with said aqueous phase.

11. A process as defined in claim 10, in which the saponification of said additional fat by treatment thereof with said aqueous phase is accomplished by admixing the fat with the aqueous phase, passing the resulting mixture through a continuous mixing apparatus at a temperature sufficiently high to effect saponification of the fat while causing precipitation of soap from the aqueous phase, and passing the resulting aqueous soap-containing mixture through a centrifugal separator to separate grained soap from the aqueous phase resulting from said step of mixing the aqueous phase containing salt and saponifying reagent with the additional fat.

ASHTON T. SCOTT.